United States Patent [19]

Bertke et al.

[11] Patent Number: 4,901,567
[45] Date of Patent: Feb. 20, 1990

[54] SHAFT DEVICE FOR A BELLOWS-TYPE GAS METER

[75] Inventors: Heinrich Bertke; Reinhard Brüggemann, both of Wallenhorst; Peter Hampel, Belm; Joachim Schmidt, Osnabrück; Werner Pohl, Westerkappeln; Martin Brönstrup, Hütte; Hans Kasselmann, Osnabrück; Hans Lübbers, Haren; Hans Prasse; Gerhard Schamel, both of Osnabrück, all of Fed. Rep. of Germany

[73] Assignee: G. Kromschroder Aktiengesellschaft, Osnabruck, Fed. Rep. of Germany

[21] Appl. No.: 71,336

[22] Filed: Jul. 9, 1987

[30] Foreign Application Priority Data

Jul. 12, 1986 [DE] Fed. Rep. of Germany ....... 3623596

[51] Int. Cl.$^4$ .............................................. G01F 1/68
[52] U.S. Cl. ...................................... 73/272 R; 73/268
[58] Field of Search .............. 73/247, 268, 281, 272 R

[56] References Cited

U.S. PATENT DOCUMENTS

| 2,746,430 | 5/1956 | Steen | 73/247 |
| 3,411,358 | 11/1968 | St. Clair et al. | 73/281 |
| 4,520,676 | 6/1985 | Hicks et al. | 73/281 |

Primary Examiner—Herbert Goldstein
Attorney, Agent, or Firm—Spensley, Horn, Jubas & Lubitz

[57] ABSTRACT

A shaft device for a bellows-type gas meter. A first eccentric cam assembly and an element having a radial groove are both coupled to the shaft. A second eccentric cam assembly having an opening is placed on the shaft. A rotatable insert element is inserted in the opening in the second eccentric cam assembly. A follower is provided on the insert element for engaging the radial groove in the element coupled to the shaft. A radial protrusion is provided for axially locking the shaft by rotating the insert element. The angle between the centerline of the first eccentric cam assembly and the centerline of the second eccentric cam assembly is adjusted by rotating the insert element.

5 Claims, 2 Drawing Sheets

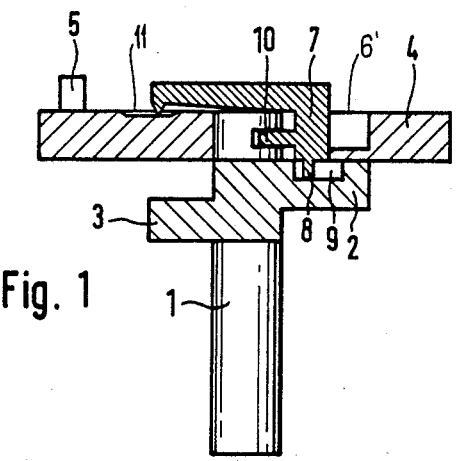
Fig. 1
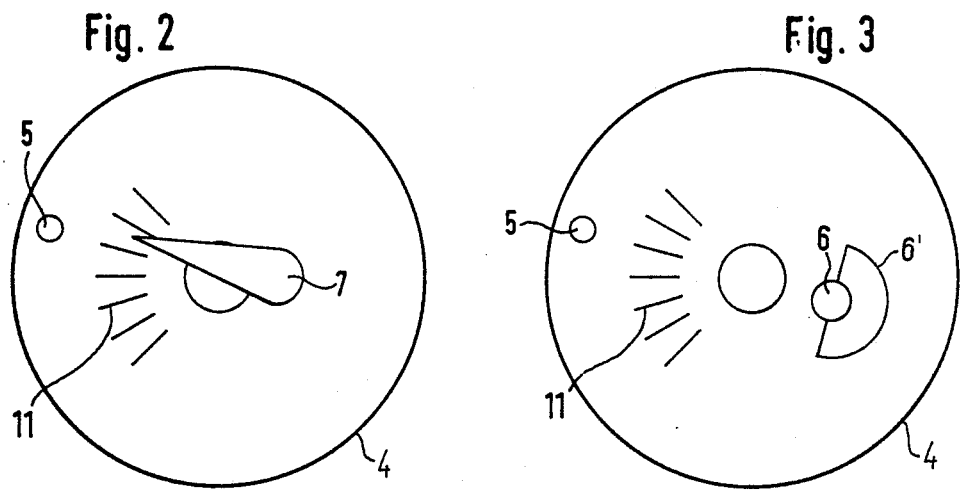
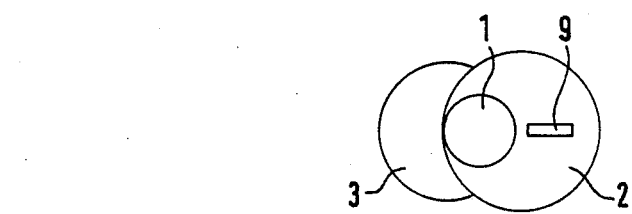
Fig. 4

SHAFT DEVICE FOR A BELLOWS-TYPE GAS METER

BACKGROUND OF THE INVENTION

The present invention relates to a shaft device particularly suitable for a bellows-type gas meter comprising at least two eccentric cam assemblies, at least the first one of said eccentric cam assemblies being firmly coupled with a shaft and at least one other eccentric cam assembly being adjustable to alter the angle enclosed between the centerline of said first eccentric cam assembly and the centerline of said other eccentric cam assembly displaced relative to said first eccentric cam assembly.

A shaft assembly is provided in bellows-type gas meters for translating the forward and backward motion of diaphragms into a rotating motion then translated into the opening and closing motions of valves creating in a cyclic mode passages between the measuring chambers of such bellows-type gas meters and the gas inlets or gas outlets of such meters respectively. An alteration of the angle enclosed between the centerline of the first eccentric cam assembly and the centerline of the other eccentric cam assembly displaced relative to said first eccentric cam assembly is necessary for each valve to close before the diaphragm operating in conjunction therewith moves into its final position at the end of each filling cycle, thereby reducing the typical error of a bellows-type gas meter.

To alter said angle, one of said eccentric cam assemblies may be a flexible crank assembly, but the use of a flexible crank assembly is associated with the disadvantage of inaccuracy. It is also known from prior art that one of said eccentric cam assemblies may be coupled with a fork-type device fitted with prongs having setting screws acting upon a lever connected with the other eccentric cam assembly, an alteration of the angle thereby becoming relatively complicated.

THE INVENTION

It is the object of the present invention to provide for an arrangement allowing an accurate and simple adjustment of the angle enclosed between two eccentric cam assemblies.

The present invention provides for such an arrangement by proposing a shaft device wherein the second eccentric cam assembly is placeable on a shaft and has an opening with an axis parallel to the axis of said shaft, said opening allowing the insertion, with a stopping means, of an insert element provided with a follower means having an axis parallel to the axis of rotation of said insert element for engaging in a radial groove of an element firmly coupled with said shaft and further provided with a radial protrusion for axially locking said shaft by a bayonette-type coupling by rotating said insert element.

Simple rotation of said insert element allows a very accurate displacement of the second eccentric cam assembly relative to the shaft and thence relative to the first eccentric cam assembly firmly coupled with said shaft, the eccentricity of the follower means determining the preselectable ratio at which the rotating motion of said insert element is translated into a displacement of said two eccentric cam assemblies relative to each other and thence allowing a highly accurate adjustment of the relative positions of said eccentric cam assemblies.

The simple design and the easy assembly of the proposed shaft device represent particular advantages of the present invention. When the second eccentric cam assembly has been placed upon the shaft, the insert element is inserted and rotated thereby locking all elements of the shaft device in their positions. The bayonette-type lock allows the rotation of the insert element without the various parts of the shaft device becoming unlocked.

In a preferred embodiment of the present invention, the first eccentric cam assembly is the element firmly coupled with the shaft and provided with a radial groove in which the insert element engages, no additional element thereby being necessary for the provision of said radial groove.

In another preferred embodiment of the present invention, the second eccentric cam assembly and the insert element interact in a self-locking fashion by way of protrusions and depressions provided in said second eccentric cam assembly and said insert element respectively, thereby allowing the relative positions to which the two eccentric cam assemblies have been adjusted to be maintained without any extra securing devices.

According to a further advantageous characteristic of the present invention, the insert element may be a pointer moving over a graduation provided on the second eccentric cam assembly for a very accurate adjustment of the relative positions of the two eccentric cam assemblies.

According to the present invention, said graduation and said pointer may be provided with protrusions and with depressions respectively to obtain the self-locking characteristics described hereinabove.

BRIEF DESCRIPTION OF THE DRAWINGS

The present invention will now be described by way of example with reference to the accompanying drawings in which FIG. 1 is a vertical section of an embodiment of the present invention showing the assembled shaft device comprising the shaft and the eccentric cam assemblies;

FIG. 2 is a top view of the shaft device shown by FIG. 1;

FIG. 3 is a top view of an embodiment of the second eccentric cam assembly; and

FIG. 4 is a top view of an embodiment of the shaft device according to the present invention with the second eccentric cam assembly removed.

DETAILED DESCRIPTION OF THE INVENTION

Figure 5:
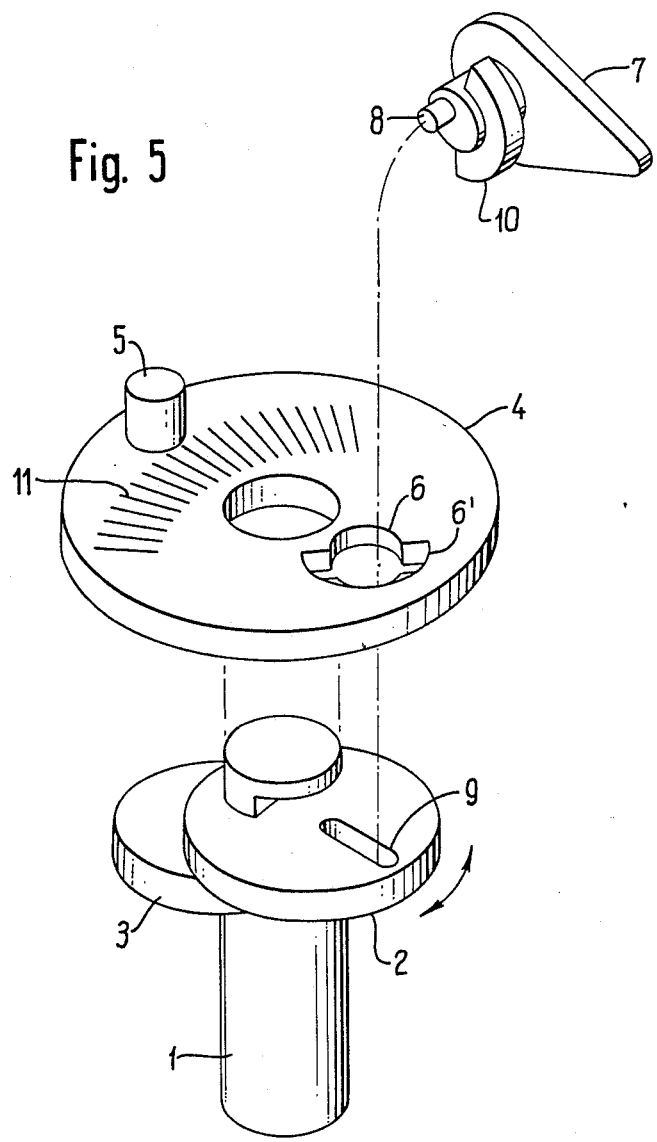
FIG. 5 is a perspective view illustrating the alignment and interaction of the elements depicted in FIGS. 1–4.

Referring first to FIG. 1, the shaft (1) of a shaft device according to the present invention accommodates first eccentric cam assemblies (2) and (3). Said two eccentric cam assemblies (2, 3) are firmly coupled with said shaft (1), said shaft (1) and said two eccentric cam assemblies (2, 3) being monolithic in the embodiment of the present invention depicted by FIG. 1. Said two eccentric cam assemblies control the valves of a bellows-type gas meter.

A second eccentric cam assembly (4) is placed on said shaft (1), the crank assembly of the diaphragms of said bellows-type gas meter engaging with the pivot (5) of said second eccentric cam assembly (4). As shown by FIG. 3, said second eccentric cam assembly (4) is provided with an opening (6) with an axis parallel to the axis of shaft (1), an insert element (7) being insertable into said opening (6). Said insert element (7) is provided with a follower means (8) with an axis parallel to the axis of rotation of said insert element (7), said follower means (8) engaging in groove (9) of the first eccentric cam assembly (2), said groove (9) being arranged radially relative to shaft (1). Said insert element (7) is further provided with a radial protrusion (10) for locking said insert element (7) and said shaft (1) relative to each other by rotating said insert element (7).

In the shaft device position shown by FIG. 1, the shaft (1), the second eccentric cam assembly (4) and the insert element (7) are locked with respect to each other in the axial direction. The second eccentric cam assembly (4) is further locked with shaft (1) in the direction of shaft rotation by the engagement of follower means (8) in groove (9).

The rotation of the insert element (7) allows a very simple and accurate adjustment of the angle enclosed between the second eccentric cam assembly (4) and the eccentric cam assemblies (2, 3) forming part of shaft (1).

In the embodiment of the present invention shown by FIG. 2, the insert element (7) is a pointer which may move over a graduation provided on the second eccentric cam assembly (4), the pointer and the graduation engaging in each other through a series of protrusions and depressions providing a self-locking mechanism making any further securing device unnecessary.

In the embodiment of the present invention depicted in the attached drawings, the eccentricity of follower means (8) causes the angle enclosed between eccentric cam assemblies (2, 3) and the second eccentric cam assembly (4) to be changed by 20° if insert element (7) is rotated by 90°.

I claim:

1. A shaft device for a bellows-type gas meter comprising:
   a shaft having an axis,
   a first eccentric cam assembly coupled to the shaft and having a centerline,
   a second eccentric cam assembly configured for placement on the shaft and having a centerline,
   the centerline of the first eccentric cam assembly and the centerline of the second eccentric cam assembly placed on the shaft mutually defining an angle,
   an element coupled to the shaft, the element having a radial groove therein,
   an opening defined in the second eccentric cam assembly, the opening having an axis parallel to the axis of the shaft,
   a rotatable insert element configured for insertion in the opening,
   a follower means provided on the insert element for engaging the radial groove, the follower means having an axis parallel to the axis of rotation of the insert element, and
   a radial protrusion for axially locking the shaft by rotating the insert element,
   whereby the angle between the centerline of the first eccentric cam assembly and the centerline of the second eccentric cam assembly placed on the shaft is adjustable by rotation of the rotatable insert element.

2. A shaft device according to claim 1, wherein the element coupled to the shaft comprises the first eccentric cam assembly.

3. A shaft device according to claims 1 or 2, further comprising a plurality of interacting protrusions and depressions formed respectively on the second eccentric cam assembly and on the insert element for interlocking the second eccentric cam assembly and the insert element.

4. A shaft device according to claim 1, wherein the second eccentric cam assembly is provided with graduations and the insert element comprises a pointer movable over the graduations.

5. A shaft device according to claim 4, wherein the graduations comprise protrusions and the pointer is provided with depressions.

* * * * *